(12) United States Patent
Williamson

(10) Patent No.: US 9,950,940 B1
(45) Date of Patent: Apr. 24, 2018

(54) WATER PURIFICATION METHOD

(71) Applicant: Paul C. Williamson, Mesa, AZ (US)

(72) Inventor: Paul C. Williamson, Mesa, AZ (US)

( * ) Notice: Subject to any disclaimer, the term of this patent is extended or adjusted under 35 U.S.C. 154(b) by 0 days.

(21) Appl. No.: 15/478,153

(22) Filed: Apr. 3, 2017

(51) Int. Cl.
*C02F 9/02* (2006.01)
*C02F 9/04* (2006.01)
*C02F 103/42* (2006.01)
*C02F 1/28* (2006.01)
*C02F 1/42* (2006.01)
*C02F 1/20* (2006.01)
*C02F 1/66* (2006.01)
*C02F 9/00* (2006.01)
*C02F 1/00* (2006.01)
*C02F 101/32* (2006.01)
*C02F 101/38* (2006.01)
*C02F 101/10* (2006.01)

(52) U.S. Cl.
CPC ............... *C02F 9/00* (2013.01); *C02F 1/001* (2013.01); *C02F 1/20* (2013.01); *C02F 1/283* (2013.01); *C02F 1/42* (2013.01); *C02F 1/66* (2013.01); *C02F 2001/422* (2013.01); *C02F 2001/425* (2013.01); *C02F 2101/10* (2013.01); *C02F 2101/322* (2013.01); *C02F 2101/38* (2013.01); *C02F 2103/42* (2013.01)

(58) Field of Classification Search
CPC .. C02F 1/001; C02F 1/20; C02F 1/283; C02F 1/42; C02F 2001/422; C02F 2001/425; C02F 1/66; C02F 9/00; C02F 2101/322; C02F 2101/36; C02F 2101/38; C02F 2103/42
See application file for complete search history.

(56) References Cited

U.S. PATENT DOCUMENTS

| 5,897,784 A | 4/1999 | Mills |
| 9,186,665 B2 | 11/2015 | Jessen et al. |
| 2006/0032375 A1* | 2/2006 | Verscharen ........ B01D 19/0015 95/263 |
| 2010/0068343 A1* | 3/2010 | Johann .................... C02F 1/003 426/66 |
| 2011/0120925 A1* | 5/2011 | McCague ............... C02F 1/001 210/167.1 |

FOREIGN PATENT DOCUMENTS

| CN | 101565246 A * | 10/2009 | |
| EP | 2377820 A1 * | 10/2011 | ............... C02F 9/00 |
| FR | 2688497 A1 * | 9/1993 | ............. B01J 41/05 |

OTHER PUBLICATIONS

Machine Translation of CN101565246A (An et al) Oct. 2009, retrieved from the internet on Jan. 8, 2017, Retrieved from <https://worldwide.espacenet.com/>, 3 pages.*
Machine Translation of EP2377820A1 (Wastuba et al) Oct. 2011, retrieved from the internet on Jan. 8, 2017. Retrieved from <URL:https://worldwide.espacenet.com/>, 25 pages.*

(Continued)

*Primary Examiner* — Matthew O Savage
(74) *Attorney, Agent, or Firm* — Prudens Law LLC

(57) ABSTRACT

A method and system used to purify water that removes or reduces volatile organic compounds, calcium carbonate, cyanuric acid, and sodium bicarbonate from water to acceptable levels.

7 Claims, 4 Drawing Sheets

(56) References Cited

OTHER PUBLICATIONS

Really don't Chance Draining the Swimming Pool-Opt for a safe and Sound Alternative, Jun. 2011, Retrieved from the internet on Jan. 8, 2017. Retrieved from <URL:https swimmingpools1.wordpress.com/tag/ion-exchange/>, 3 pages.*

Lower Total Alkalinity, Jan. 2014, Retrieved from the internet on Jan. 8, 2017. Retrieved from <URL: https://www.troublefreepool.com/content/129-how-to-lower-lowering-total-alkalinity>, 2 pages.*

Lowry, Using Air and Acid to Quickly Get Perfect pH/Alkalinity, Sep. 2016, retrieved from the internet on Jan. 8, 2017. Retrieved from <URL: http://aquamagazine.com/service/using-air-and-acid-to-quickly-get-perfect-ph-alkalinity.html>, 6 pages.*

Miller, W.S., Castagna, C.J., and Pieper, A.W., Understanding Ion-Exchange Resins for Water Treatment Systems, Plant Engineering, Feb. 19, 1981, pp. 1-13, Dun.Donnelley Publishing Corp.

Aghoyeh, Reza Gholizadeh and Khalafi, Hossein, Design of dual column water purification system for industrial gamma irradiator based of Purolite resins, Annals of Nuclear Energy, 2014, pp. 90-96, vol. 69.

* cited by examiner

FIG. 2  TOP VIEW

WATER PURIFICATION METHOD

TECHNICAL FIELD

The present invention is generally related to water purification.

BACKGROUND

People use water for a variety of recreational activities or for aesthetics. A common and well known issue is maintaining the condition of the water. Proper sanitation of the water is frequently mandated or heavily regulated to ensure safe and healthy water for its desired use. A variety of methods are employed, such as physical filtering and chemical processing, to reduce or remove various contaminants from the water. For example, in commercial and residential swimming pools, a mixture of chemicals is used to get rid of bacteria, disinfect the pool water, and keep the water comfortable for users.

Various techniques and equipment have been created to maintain pool water quality. Filtration units, water pumps, skimmers, automated pool cleaners, chlorination systems, heaters and various automated water circulators have been created to ease water maintenance. However, the chemistry of maintaining water generally remains the same—in that whatever chemicals are used, they must remain in balance for safe and comfortable experience. For example, chlorine is used to disinfect the water, but the chlorine must be stabilized or else it quickly loses its effectiveness to disinfect. An acid, such as cyanuric acid is sometimes used to "protect" the chlorine so that its effectiveness can be maintained. But, the use of cyanuric acid creates another issue in that over long term use, the acid builds up and can become uncomfortable to humans and a detriment to equipment. For example, buildup of acid interferes with chlorine's ability to kill certain unsafe microorganisms in the water.

As pool use increases, calcium plus other contaminants build up, and the pH of the water becomes too acidic or basic, which is uncomfortable for many pool users. Temperature variations also affect the rate of evaporation, which can affect the level of calcium, the pH and impact the surfaces and equipment of the pool. At some point, the body of water is unable to take more chemical treatment before needing to be changed. Typically, to combat these effects, the water is partially or fully drained and new water is added. Then, the chemicals are added, the pool is stabilized and the process begins again.

This drain and fill process wastes water. Reputable companies and responsible owners are supposed to properly dispose of the water and the chemicals within it, but compliance is hard to govern. In some instances, the water is drained straight into a backyard, a street, or down a sewer possibly causing environmentally long term hazardous conditions. Further, many pools are in arid or dry climates where water supply is low and possibly expensive to replace. The cost and environmental burden to drain and refill a pool can be prohibitive. What is needed is a system and method that can safely treat the water, limit water and chemical usage and waste, and effectively remove and retain hazardous waste byproducts for proper disposal.

SUMMARY

While the way in which the present invention addresses the disadvantages of the prior art will be discussed in greater detail below, in general, the present invention provides for water purification. In particular, the present invention provides a system and method to purify water of contaminants such as volatile organic compounds (VOCs), calcium carbonate, cyanuric acid, calcium carbonate, and sodium bicarbonate.

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description, or may be learned by the practice of the invention.

BRIEF DESCRIPTION OF THE DRAWINGS

To describe the way the advantages and features of the present invention can be obtained, a more particular description of the present invention will be rendered by reference to specific embodiments and examples, which are illustrated in the appended drawings. Understanding that these drawings depict only typical embodiments of the invention and are not therefore to be limiting of its scope, the present invention will be described and explained with additional specificity and detail using the accompanying drawings in which.

DETAILED DESCRIPTION

Various embodiments of the invention are described in detail below. While specific implementations involving water purification are described, the description is merely illustrative and not intended to limit the scope of the various aspects of the invention. For example, the water purification system involves the movement of water from one system to another system. Transport of the water may be accomplished via pumps, pipes, fittings, and valves of varying models and construction (e.g., PVC, vinyl, copper, etc.) depending on the application. A person skilled in the relevant art will recognize that other components and configurations may be easily used or substituted than those that are described without parting from the spirit and scope of the invention. As will be appreciated by one of ordinary skill in the art, the system may be embodied as a customization of an existing system, an add-on product, and/or a stand-alone system.

As will become apparent from the following descriptions, the present invention purifies water. In particular, the present invention provides a system and method to purify water of contaminants such as volatile organic compounds (VOCs), calcium carbonate, cyanuric acid, and sodium bicarbonate.

In general, the present invention provides a method of water purification. In its various embodiments, the method removes or reduces volatile organic compounds, calcium carbonate, cyanuric acid, and sodium bicarbonate from water to acceptable levels. Depending on the application, the method also may remove or reduce physical particles from the water, adjust the water's pH level, or remove excess carbon dioxide from the water. In an exemplary embodiment, the method is used to purify water from a pool or spa. Although the method is described as purifying pool water, the method may be used to purify water from any body of water, such as fountains, water displays, theme parks, spas or hot tubs, therapy pools (e.g., in hospitals, physical therapy locations, sports facilities), public pools (e.g., in hotels, apartment complexes, health clubs, campgrounds), ponds, or man-made water features. This list is exemplary of typical bodies of water and non-exhaustive. It is not meant to limit the invention to only those applications described.

Figure 1:
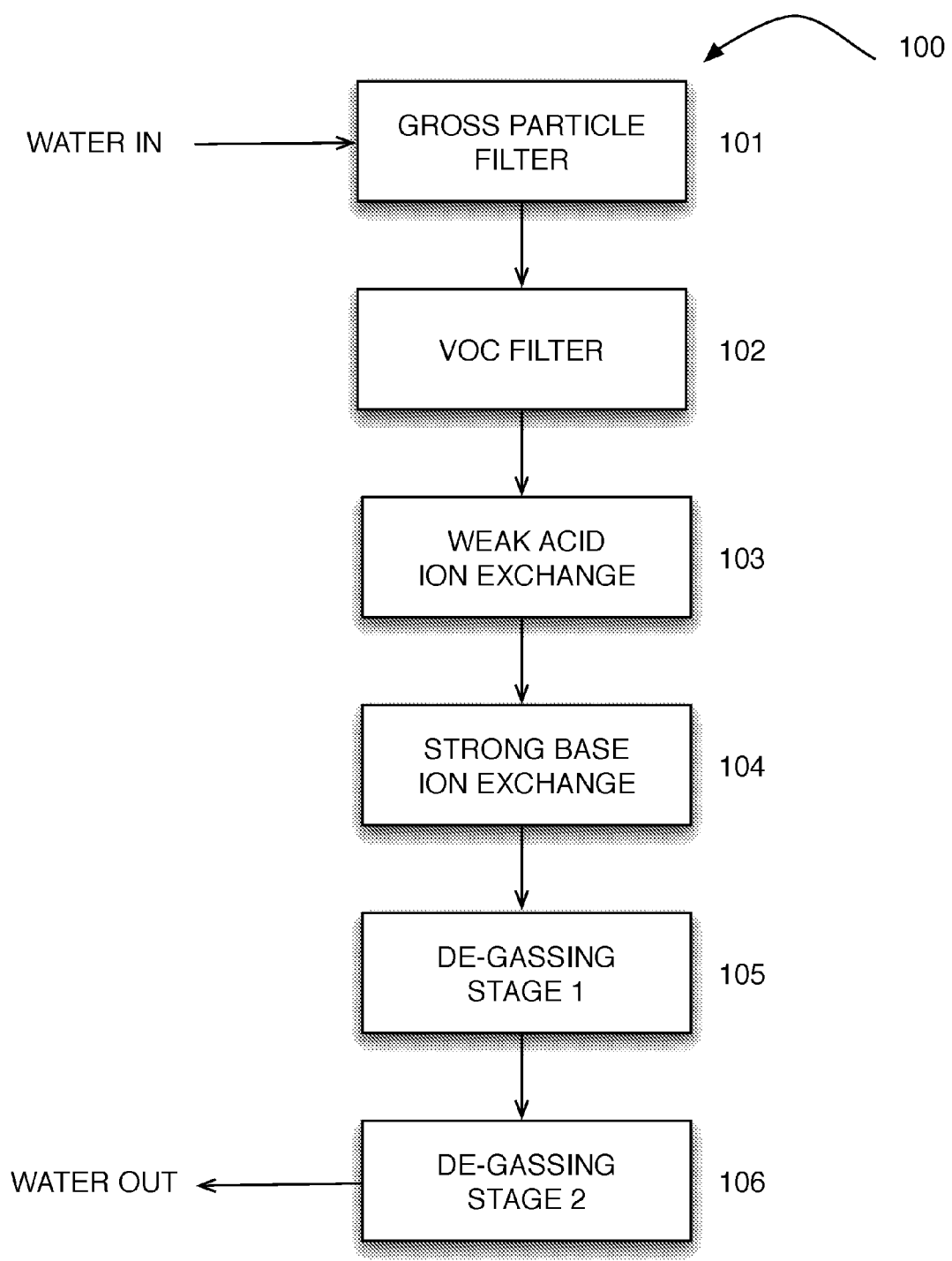
FIG. 1 illustrates an exemplary embodiment of a water purification method of the present invention.

FIG. 1 is a flow chart illustrating an exemplary embodiment of the water purification method 100 used to purify a body of water, e.g., a residential pool. A pipe or similar inlet device is placed in the water to receive the water from the pool. The method comprises removing or reducing undissolved or suspended solids from the water by pumping the water from the pool through a filter 101. Any type of filter that can remove gross particles from a water flow is within the scope of the present invention. In an exemplary embodiment, the filter is a cartridge filter. The filter may be of any suitable size depending on the application. An exemplary size is 75 square feet in surface area. In an exemplary embodiment, the method removes particles greater than 20 microns.

The method comprises removing volatile organic compounds (VOCs) from the water 102. Pool water becomes contaminated with compounds such as calcium, fluoride, heavy metals (e.g., lead, mercury), nitrates/nitrites, and bacteria. In its embodiments, the method removes various VOCs from the water to acceptable ranges. In some embodiments, VOCs are removed by passing the water flow over an adsorbent material capable of removing the various chemicals from the stream. In some embodiments, the adsorbent material is activated charcoal, also referred to as activated carbon. In an exemplary embodiment, the activated charcoal is granular activated charcoal. However, any material that may absorb VOCs in a water stream is suitable and is within the scope of the invention.

Once the VOCs are removed, the method comprises removing calcium hardness from the water 103. Calcium hardness in pool water is the result of calcium carbonate ($CaCO_3$) build-up, which forms an insoluble precipitate in the water. Calcium hardness will result in scale formation on surfaces, filters, and pipes. The water flow is passed through a sodium form weak acid cation-ion exchange resin to remove calcium molecules present in the water. To remove the calcium ion from the carbonate molecule, the calcium molecule is exchanged with a sodium molecule according to the following equation:

'R' represents a weak acid cation ion exchange resin. An exemplary resin is Rohm and Haas Amberlite. However, any weak acid cation exchange resin that achieves the exchange of the calcium ion from the carbonate is suitable. One benefit to exchanging the sodium ion with the calcium ion is that the sodium bicarbonate ($Na_2CO_3$) typically remains soluble in the water and does not precipitate out or cause scale formation in the water or on equipment. In an exemplary embodiment, the method removes 2400 parts per million of calcium carbonate from the water.

After calcium carbonate removal, the method comprises removing cyanuric acid $(CNOH)_3$, also referred to as isocyanuric acid 104. Cyanuric acid is added and used in chlorinated water to stabilize the chlorine and prevent algae growth. Cyanuric acid can absorb ultraviolet light, which protects the chlorine from the sun. The acid binds with free chlorine in the water until the chlorine kills bacteria in the water or is otherwise used up. However, as concentrations of cyanuric acid in water increase, the effectiveness of chlorine will decrease. To remove cyanuric acid, the water is passed through a strong base anion exchange resin according to the following equation:

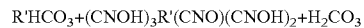

In the equation $R'HCO_3$ represents a strong base anion exchange resin. An exemplary resin is Resintech SBG1P. However, any strong base anion exchange resin that achieves the exchange of the cyanuric acid is suitable. In an exemplary embodiment, the method removes 1250 parts per million of cyanuric acid from the water. Also because of the strong base anion exchange, carbonic acid ($H_2CO_3$) is produced. The carbonic acid produced in this step of the method will breakdown to form water and carbon dioxide according to the equation below:

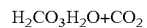

After cyanuric acid removal, the method comprises decreasing the alkalinity, e.g., sodium carbonate, and treating the pH of the water 105. High alkalinity levels in water may result in irritation to users and make it difficult to maintain the pH level of the water at a comfortable level. High alkalinity also can be a detriment to equipment and surfaces. To reduce the alkalinity level, a two-stage de-gassing process is used. The first stage comprises introducing hydrochloric acid (HCl) into the water flow from the cyanuric acid removal step which will adjust the water pH and alkalinity according to the following equation:

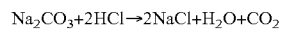

Though hydrochloric acid is used in this process, other acids that reduce alkalinity, e.g., citric acid, are within the scope of the invention.

After the first stage de-gassing, the method comprises reducing the carbon dioxide remaining in the water stream ("de-gassing stage 2") 106. In its embodiments, the reduction is achieved by physically agitating the water flow. In an exemplary embodiment, the water flow is pumped through a reaction chamber containing small spheres of material. The spheres may be solid, hollow, or have perforations on its surface (e.g., like a wiffle ball). Air is forced into the reaction chamber causing the water droplets to "bounce" off the surface of the spheres. This physical agitation results in the water releasing dissolved carbon dioxide from the water. After de-gassing, the water is returned to the pool through a pipe or other outlet.

One aspect of water purification of a water source is how much water needs to be cycled through a treatment method before one can be sure the process has removed the proper amount of contaminants. Using this method enables a smaller amount of water to be pumped from the water source through the method and returned to the water source than traditional methods. In other words, not all the water of the water source may need to be cycled through the method.

A water purification system includes components configured to purify water by removing contaminants such as volatile organic compounds (VOCs), calcium carbonate, cyanuric acid, and sodium bicarbonate from water to acceptable levels. The water purification system includes a filtering system, an ion exchange system, a de-gassing system, and a control system. In its embodiments, the water is pumped from a water source (e.g., a swimming pool) through the filtering system. Then, the water flows from the filtering system to the ion exchange system. The ion exchange system may be configured as a single pass system or it may pass the water flow through the ion exchange system more than once. After the desired number of passes through the ion exchange system, the water flows from the ion exchange system to the de-gassing system to eliminate carbon dioxide resulting from the ion exchange process. Lastly, the water is pumped back to the water source. An electrical control system comprised of pumps, sensors, valves, and test and metering devices may optionally be used to control water flow through the various systems.

The water purification system may be stationary (e.g., remains on-site), configured as a mobile system, or as a combination of stationary and mobile systems. For example, the system may be encompassed in a mobile vehicle (e.g., a truck or van), in or on a trailer to be pulled by a vehicle, or as a unit to be carried by a technician or pulled on a small dolly or hand truck. Any configuration that enables the components of the system to purify water using the method described above is part of the scope of the invention.

Figure 2:
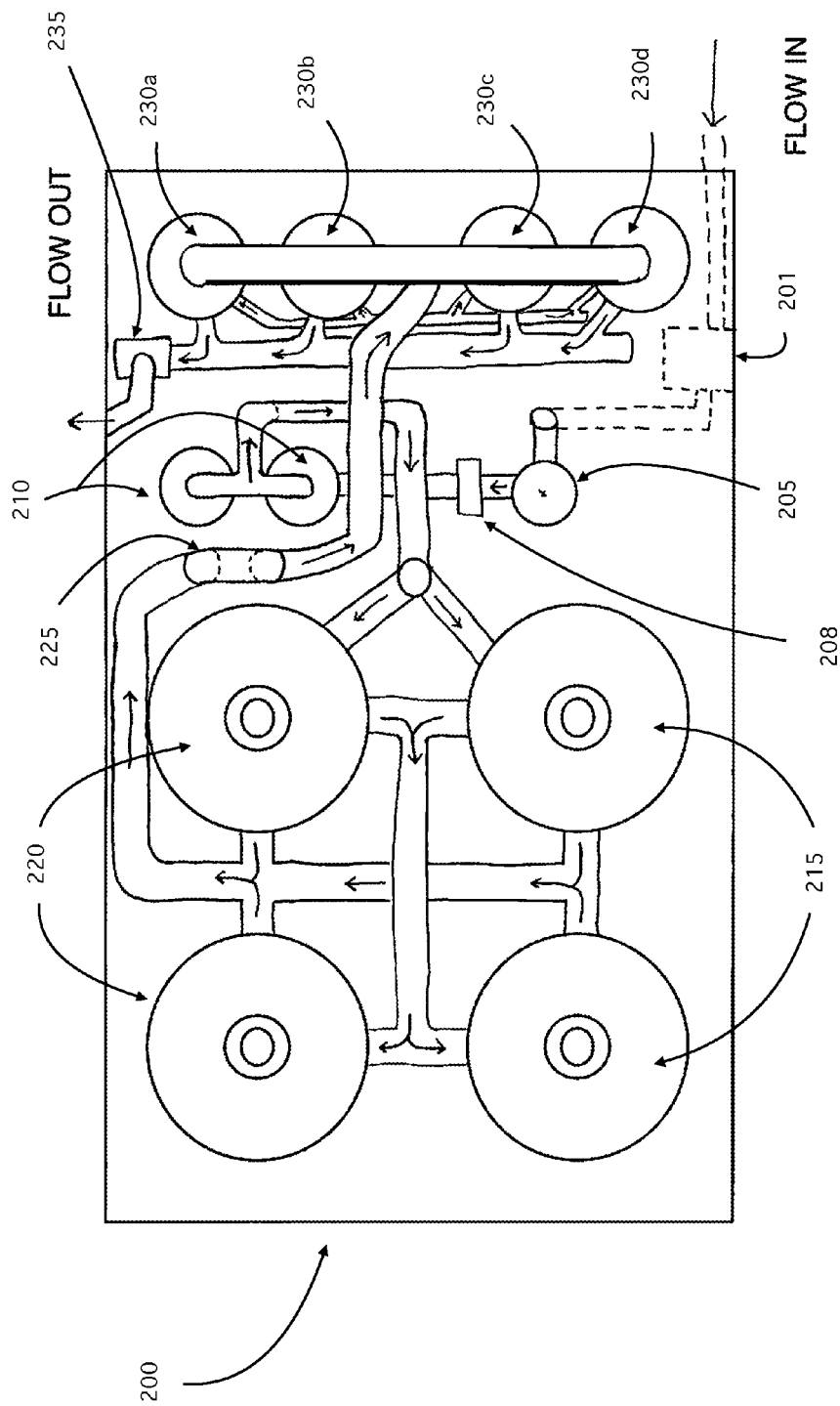
FIG. 2 illustrates a top view of an exemplary embodiment of a water purification system of the present invention.

FIG. 2 shows a top view of an exemplary embodiment of the water purification system 200 configured as an enclosed trailer to be pulled by a vehicle to the desired water sources. An intake pump 201 is connected to a pipe or hose that is placed in the water source to pump water through the system. The filtering system includes components to filter physical particles and/or volatile organic compounds (VOCs) from the water flow. The filtering system may comprise one or more stages depending on the application. FIG. 2 illustrates a two-stage filtering system. In the first stage, water flow is passed through a cartridge filter 205 that removes physical particles. The size of the filter depends on the purification application. In the second stage, the filtered water flow is then passed through an adsorbent material capable of removing the various chemicals 210. In some embodiments, the adsorbent material is activated charcoal. FIG. 2 shows two pressure vessels, however, any number of vessels may be used depending on the application. The water continues its flow through the system from the filtering system to the ion exchange system.

The ion exchange system includes any components suitably configured to remove calcium hardness and/or cyanuric acid from the water. Depending on the configuration of the system, the ion exchange system may be configured to exclusively remove calcium hardness, exclusively remove cyanuric acid, or remove both. For example, in a mobile application where a technician cleans multiple water sources a day (e.g., residential or commercial pools), each water source will exhibit varying hardness and cyanuric characteristics. The system may begin removing both calcium carbonate and cyanuric acid, but as these compounds are removed, it is possible that the treatment may only need to continue treating one of the compounds. The ion exchange system may be configured to shut down, for example, calcium carbonate removal, while continuing to treat for cyanuric acid without disturbing the overall operation and flow of water through the system. FIG. 2 illustrates a dual ion exchange system that uses two tanks for calcium carbonate removal 215 and two tanks for cyanuric acid removal 220. The tanks are filled with the reactant to interact with the water. Any number of tanks may be used for the ion exchange system depending on the application and is within the scope of this invention. It is also not necessary that the number of tanks for one ion exchange process be used for the other ion exchange process (e.g., one tank could be used for calcium carbonate treatment and three tanks could be used for cyanuric acid treatment). If one of the exchange processes is shut down or not used, the water flow may either travel through the tanks without reaction or be diverted by valves within the system. The water continues to flow from the ion exchange system into the de-gassing system.

Figure 3:
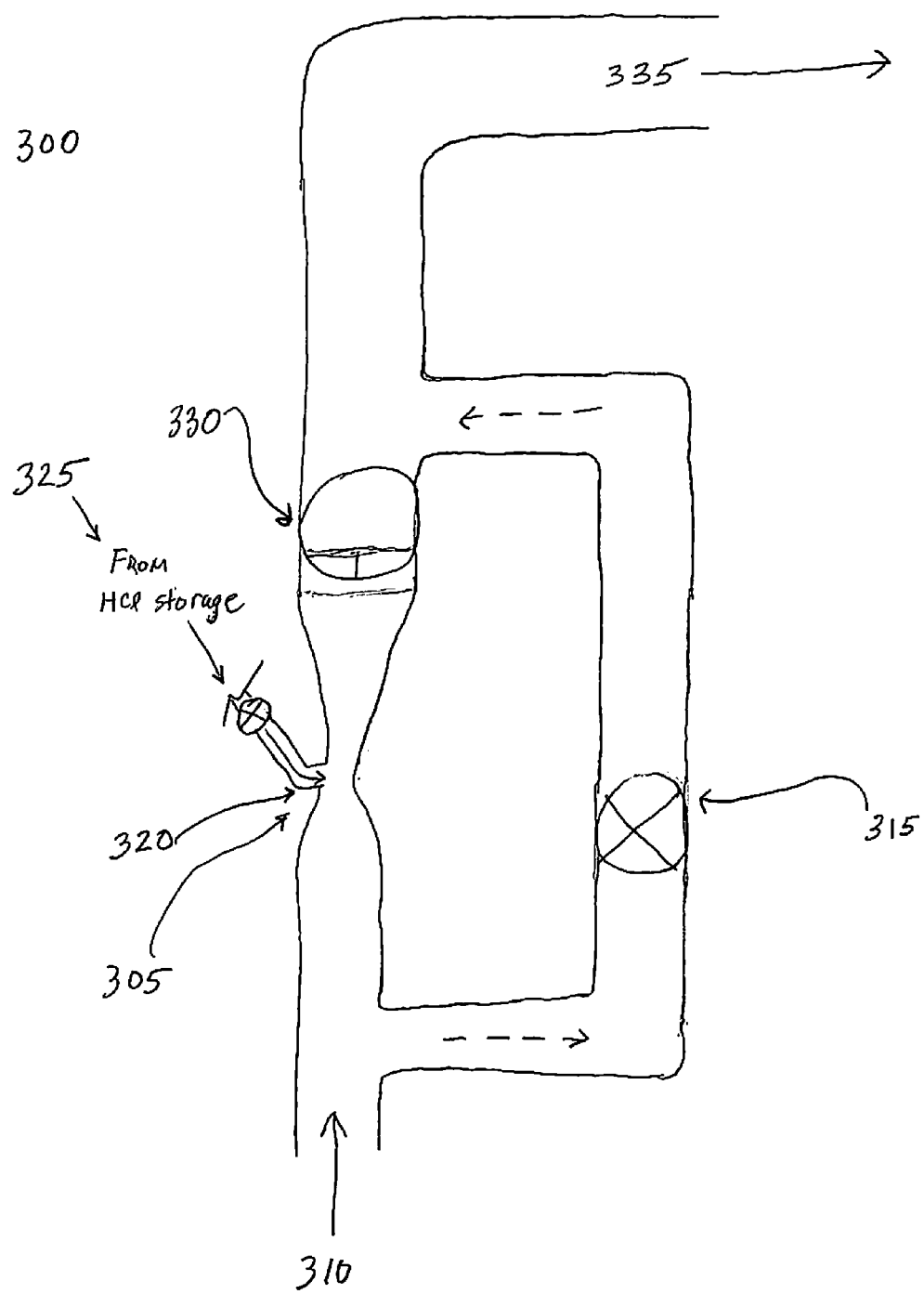
FIG. 3 illustrates an exemplary embodiment of an acidification system of the present invention.

The de-gassing system includes any components suitably configured to decrease the alkalinity and treat the pH of the water. FIG. 2 illustrates a two stage de-gassing system (225 and 230). The first stage comprises an acidification system 225 receiving the water flow from the ion exchange system (215 and 220) and treating the water with hydrochloric acid. As the water flows into the system's reaction chamber, the water continues to flow towards stage two of the de-gassing system. FIG. 3 illustrates an exemplary embodiment of an acidification system 300. The system comprises a multiport venturi injector 305 connected to tubing from the ion exchange system 310. Bypass tubing and valve 315 is configured so that the water flow may be diverted around the venturi injector 305 when further acid treatment is not needed. Acid is introduced into the water flow by a spray nozzle 320, which receives acid from an acid containment vessel 325. The water flows from the venturi injector 305 through a check valve 330 to the reaction chamber 335. The water continues its flow through the reaction chamber 335 to the de-gassing system.

Stage two of the de-gassing system includes any components suitably configured to reduce carbon dioxide in the water stream. In its embodiments, the second stage of the de-gassing system physically agitates the water flow, which causes carbon dioxide to be released. Agitation may be achieved by a variety of methods, such as physically moving chambers full of the water or introducing agitating agents into the water stream. FIG. 2 illustrates the second stage of the de-gassing system 230 receiving the water flow from the first stage of the acidification system 225. The water is pumped to the top of the chambers as air is forced through the bottom of the chambers. The second stage of the de-gassing system may contain any number of chambers and may also contain one or more stages of chambers depending on the application. FIG. 2 shows four chambers arranged in a two-step de-gassing process. The water flows through the first stage chambers 30$a$ and 30$b$ and then is pumped to the top of chambers 30$c$ and 30$d$ to repeat the process. The water flows from the bottom of chambers 30$c$ and 30$d$ back to the water source.

Figure 4:
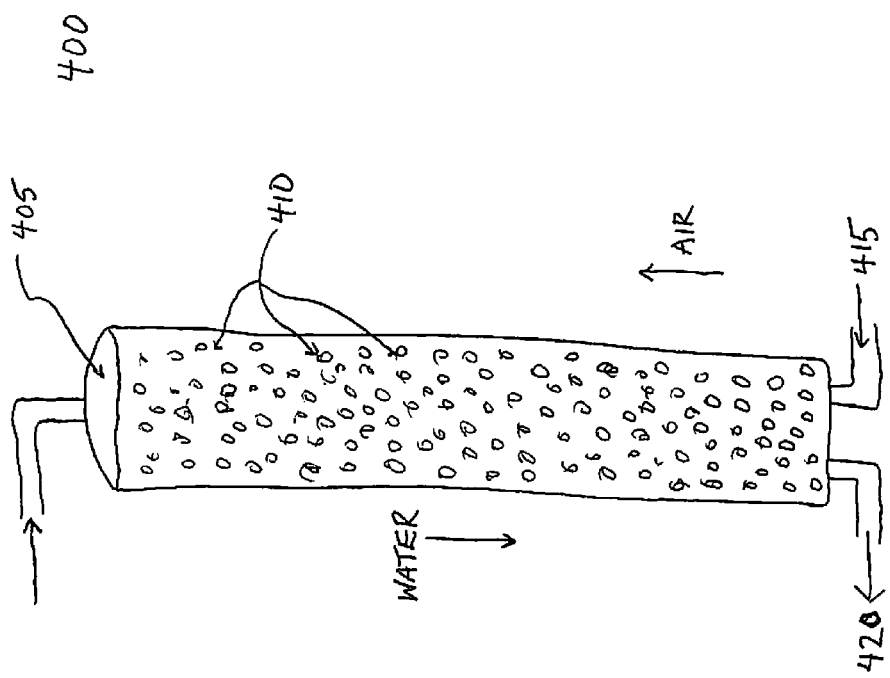
FIG. 4 illustrates an exemplary embodiment of a degassing chamber of the present invention.

FIG. 4 illustrates an exemplary embodiment of a de-gassing chamber 400. Water flows into the top of the chamber to a spray head 405. The chamber 400 is filled with perforated polypropylene spheres 410. The spray head distributes water droplets across the polypropylene spheres. The spray head produces small water volumes so that the droplets "bounce" off the spheres. Air is pumped into the bottom of the chamber at port 415 creating the agitation so that the droplets bounce off the spheres and release carbon dioxide. Once the droplets reach the bottom of the chamber, the water flows out of the chamber at port 420.

The water purification system may optionally include an oxidation-reduction potential sensor. The sensor is placed in the water flow so that readings may be made to inform a technician (in a manually operated process) or an automated control system of the free chlorine in the water source that is available to sanitize the system. FIG. 2, ref. 208 illustrates an exemplary placement of the sensor.

The water purification system may optionally include an automated control system. In its embodiments, the automated control system accepts data inputted at a control panel from a technician or the system may be configured to read water parameters from a sensor placed at water flow input at the beginning of the water purification system. For example, parameters such as volume, current cyanuric acid level, total chlorine level, pH, and alkalinity may be entered. Sensors, valves, and meters placed at input and output points at each stage provide data to a central processing unit within the automated control system to monitor the water parameters as it moves through the water purification system. The automated control system is configured to intervene in the process in a variety of ways to affect the flow of water through the system, the flow of air through the de-gassing system, and the introduction of chemicals at the ion exchange and acidification systems. Additionally, the control system may employ partial automated and partial manual controls depending on the application.

The automated control system may employ various integrated circuit components, e.g., memory elements, processing elements, logic elements, audio and/or visual elements, input/output elements, wired or wireless communication techniques, and the like, which may carry out a variety of functions under the control of one or more microprocessors or other control devices. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The automated control system may also alert the operator via email, text, phone, or other electronic communication concerning the operation of the water purification system, e.g. operation completed, time left for completion, errors, alerts and the like.

Although the above description may contain specific details, they should not be construed as limiting the claims in any way. Other configurations of the described embodiments of the invention are part of the scope of this invention. The descriptions and embodiments are not intended to be exhaustive or to limit the invention to the precise forms disclosed.

What is claimed is:

1. A method for purifying water from a water source comprising:
   (a) receiving a flow of water from a water source;
   (b) reducing undissolved or suspended solids from the flow of water from step (a) through gross particle filtration;
   (c) receiving the flow of water from step (b) and reducing volatile organic compounds in the flow of water from step (b) by passing the flow of water from step (b) through an adsorbent material;
   (d) receiving the flow of water from step (c) and reducing hardness in the flow of water from step (c) by passing the flow of water from step (c) through a sodium form weak acid cation-ion exchange resin;
   (e) receiving the flow of water from step (d) and reducing cyanuric acid in the flow of water from step (d) by passing the flow of water from step (d) through a strong base anion exchange resin;
   (f) receiving the flow of water from step (e) and decreasing alkalinity in the flow of water from step (e) by injecting an acid into flow of water from step (e);
   (g) receiving the flow of water from step (f) and reducing carbon dioxide in the flow of water from step (f) by agitating the flow of water from step (f); and
   (h) returning the flow of water from step (g) to the water source.

2. The method of claim 1, wherein the adsorbent material is activated carbon.

3. The method of claim 1, wherein the reducing hardness is according to the chemical formula: $2\ RNa+CaCO_3 R_2Ca+Na_2CO_3$, wherein R represents the weak acid cation ion exchange resin.

4. The method of claim 1, wherein the reducing cyanuric acid is according to the chemical formula: $R'HCO_3+(CNOH)_3 R'(CNO)(CNOH)_2+H_2CO_3$, wherein R' represents the strong base anion exchange resin.

5. The method of claim 1, wherein the acid is hydrochloric acid.

6. The method of claim 5, wherein the acid is injected according to the chemical formula: $Na_2CO_3+2HCl2NaCl+H_2O+CO_2$.

7. The method of claim 1, wherein step (g) further comprising comprises agitating the flow of water from step (f) by spraying the water from step (f) into a chamber filled with small spheres of material and forcing air through the chamber.

\* \* \* \* \*